(12) United States Patent
Bell et al.

(10) Patent No.: US 10,650,416 B1
(45) Date of Patent: May 12, 2020

(54) LIVE PRODUCTION INTERFACE AND RESPONSE TESTING

(71) Applicant: Sprint Communications Company L.P., Overland Park, KS (US)

(72) Inventors: Timothy L. Bell, Shawnee, KS (US); Wayne W. Schroeder, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 448 days.

(21) Appl. No.: 15/436,673

(22) Filed: Feb. 17, 2017

(51) Int. Cl.
*G06Q 30/02* (2012.01)

(52) U.S. Cl.
CPC ..... *G06Q 30/0275* (2013.01); *G06Q 30/0267* (2013.01)

(58) Field of Classification Search
USPC .............................................. 705/14.1–14.73
See application file for complete search history.

(56) References Cited

U.S. PATENT DOCUMENTS

| | | | | |
|---|---|---|---|---|
| 2011/0161843 | A1* | 6/2011 | Bennett | G06F 3/14 715/760 |
| 2012/0036023 | A1* | 2/2012 | Das | G06Q 30/02 705/14.71 |
| 2012/0303462 | A1* | 11/2012 | Mysen | G06O 30/02 705/14.71 |
| 2013/0063561 | A1* | 3/2013 | Stephan | H04N 13/302 348/46 |
| 2014/0149212 | A1* | 5/2014 | Shimura | G06Q 30/0254 705/14.52 |
| 2015/0332329 | A1* | 11/2015 | Luo | H04W 4/021 705/14.58 |
| 2019/0156370 | A1* | 5/2019 | Harrison | G06Q 30/0267 |

FOREIGN PATENT DOCUMENTS

KR 20150112055 A * 10/2015

OTHER PUBLICATIONS

Jonathan Hare-Winton & Sam Cutler, Testing in Production: How we combined tests with monitoring, 2016 (Year: 2016).*

* cited by examiner

*Primary Examiner* — E Carvalho

(57) ABSTRACT

A simulated ad placement bid request supply side platform. The platform comprises a processor, a memory, and a test mobile ad placement bid request generator application stored in the memory. When executed by the processor the application builds a plurality of mobile ad placement bid requests, where each mobile ad placement bid request comprises a test parameter value that indicates the bid request is a test bid request, transmits the plurality of mobile ad placement bid requests built by the test mobile ad placement bid request generator application to the bidding platform, receives winning mobile ad placement bids associated with the mobile ad placement bid requests sent by the test mobile ad placement bid request generator application, and analyzes the winning mobile ad placement bids received by the test mobile ad placement bid request generator application to determine test metrics.

17 Claims, 8 Drawing Sheets

LIVE PRODUCTION INTERFACE AND RESPONSE TESTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telecommunication devices such as smart phones, tablet computers, and similar devices may be capable of displaying advertisements in a web browser or other application. An entity that provides an opportunity for displaying an advertisement on a mobile device may be referred to as the supply side of a transaction for displaying advertisements. An entity that takes advantage of such an opportunity and provides an advertisement to be displayed in an application controlled by the supply side may be referred to as the demand side of the transaction. When an opportunity for displaying an advertisement on a mobile device arises, the supply side may notify a plurality of potential advertisers on the demand side that the opportunity exists. Any number of the potential advertisers may then decide to send a bid on the opportunity for displaying an advertisement to the supply side. The supply side may select one of the bids as a winner and inform the winner of the selection. The demand side may then take appropriate steps to place an advertisement in the application controlled by the supply side.

The notification of the existence of a bid opportunity by the supply side and the transmission of a bid by the demand side may occur via a bid exchange system or a similar entity. That is, the supply side may send a notification of a bid opportunity to the bid system, which may include a plurality of bid exchange servers or similar components. The bid system may then inform a plurality of bidders on the demand side of the bid opportunity. The bidders may then send the bid system bids related to one or more advertisements that are desired to be placed in an application on a mobile device capable of communicating with the supply side. The bids may indicate prices the bidders are willing to pay for placing the advertisements and other parameters associated with the advertisements. The bid exchange servers in the bid system may select the most desirable bid based on the parameters received from the demand side and on selection criteria specified by the supply side and/or other entities. The bid system may then inform the winning bidder that its bid was successful and may inform the supply side that a winning bid has been selected. The winning bidder may then provide one or more advertisements associated with the winning bid either directly to the supply side, via the bid exchange, or via some other third party. The supply side may then take appropriate steps for displaying an advertisement on the mobile device that provided the bid opportunity.

SUMMARY

In an embodiment, a real-time bidding exchange for mobile ad placement is disclosed. The real-time bidding exchange comprises a bidding platform and a simulated ad placement bid request supply side platform. The bidding platform comprises a first processor, a first memory, a bid brokering application stored in the first memory, and a bid accounting application stored in the first memory. When executed by the first processor, the bid brokering application receives mobile ad placement bid requests from supply side platforms, transmits the mobile ad placement bid requests to a plurality of mobile ad placement bidders, receives mobile ad placement bids associated with the mobile ad placement requests from the plurality of mobile ad placement bidders, selects winning mobile ad placement bids from among the mobile ad placement bids, and transmits the winning mobile ad placement bids to the supply side platform that sent the mobile ad placement bid request associated with the winning mobile ad placement bid. When executed by the first processor, the bid accounting application analyzes winning mobile ad placement bids to determine the value of a test parameter of the mobile ad placement bid, accumulates winning bid costs to associated accounts of each of the plurality of mobile ad placement bidders for winning bids determined to be actual bids based on the value of the test parameter value of the bid, and accumulates winning bid costs to a test log for winning bids determined to be test bids based on the value of the test parameter of the bids. The simulated ad placement bid request supply side platform comprises a second processor, a second memory, and a test mobile ad placement bid request generator application stored in the second memory. When executed by the second processor, the test mobile ad placement bid request generator application builds a plurality of mobile ad placement bid requests, where each mobile ad placement bid request test parameter value indicates that it is a test bid request, transmits the plurality of mobile ad placement bid requests built by the test mobile ad placement bid request generator application to the bidding platform, receives winning mobile ad placement bids associated with the mobile ad placement bid requests sent by the test mobile ad placement bid request generator application, and analyzes the winning mobile ad placement bids received by the test mobile ad placement bid request generator application to determine test metrics.

In another embodiment, a method of performing continuous testing of a real-time mobile ad placement bidding exchange while under production loading is disclosed. The method comprises receiving mobile ad placement bid requests from a plurality of supply side platforms, where some of the bid requests comprise a test parameter value that indicates they are test bid requests, transmitting the mobile ad placement bid requests to a plurality of mobile ad placement bidders, and receiving mobile ad placement bids from the plurality of mobile ad placement bidders. The method further comprise selecting winning mobile ad placement bids from among the mobile ad placement bids received from the plurality of mobile ad placement bidders, sending winning mobile ad placement bids to the associated supply side platforms, and analyzing winning mobile ad placement bids to determine the value of a test parameter of the mobile ad placement bids. The method further comprises accumulating winning bid costs to associated accounts of each of the plurality of mobile ad placement bidders for winning bids determined to be actual bids based on the value of the test parameter of the bid, accumulating winning bid costs to a test log for winning bids determined to be test bids based on the value of the test parameter of the bids, generating a test result report based on analyzing winning mobile ad placement bids and mobile ad placement bids determined to be test bids based on the value of the test parameter of the bids and based on evaluating handling of one of a bid request format or a bid response format by the mobile ad placement bidders, and providing the test result report to the supply side platform that is associated with mobile ad placement bid requests determined to be test bid requests based on the value of the test parameter of the requests, whereby a supply side platform tests handling of mobile ad placement bid requests having either a new bid request format or a new bid response format in a real-time mobile ad placement bidding exchange under production loading.

In another embodiment, a method of integrating a mobile ad placement bidder by a real-time mobile ad placement bidding exchange while under production loading is provided. The method comprises receiving mobile ad placement bid requests from a plurality of supply side platforms, where some of the bid requests comprise a test parameter value that indicates they are test bid requests, transmitting the mobile ad placement bid requests to a plurality of mobile ad placement bidders, where one of the mobile ad placement bidders is engaged in integrating with the real-time mobile ad placement bidding exchange, and receiving mobile ad placement bids from the plurality of mobile ad placement bidders. The method further comprises selecting winning mobile ad placement bids from among the mobile ad placement bids received from the plurality of mobile ad placement bidders, sending winning mobile ad placement bids to the associated supply side platforms, and analyzing winning mobile ad placement bids to determine the value of a test parameter of the mobile ad placement bids. The method further comprises accumulating winning bid costs to associated accounts of each of the plurality of mobile ad placement bidders for winning bids determined to be actual bids based on the value of the test parameter of the bids, accumulating winning bid costs to a test log for winning bids determined to be test bids based on the value of the test parameter of the bids, and generating a test result report based on analyzing mobile ad placement bids determined to be test bids based on the value of the test parameter of the bids received from the mobile ad placement bidder engaged in integrating with the real-time mobile ad placement bidding exchange.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
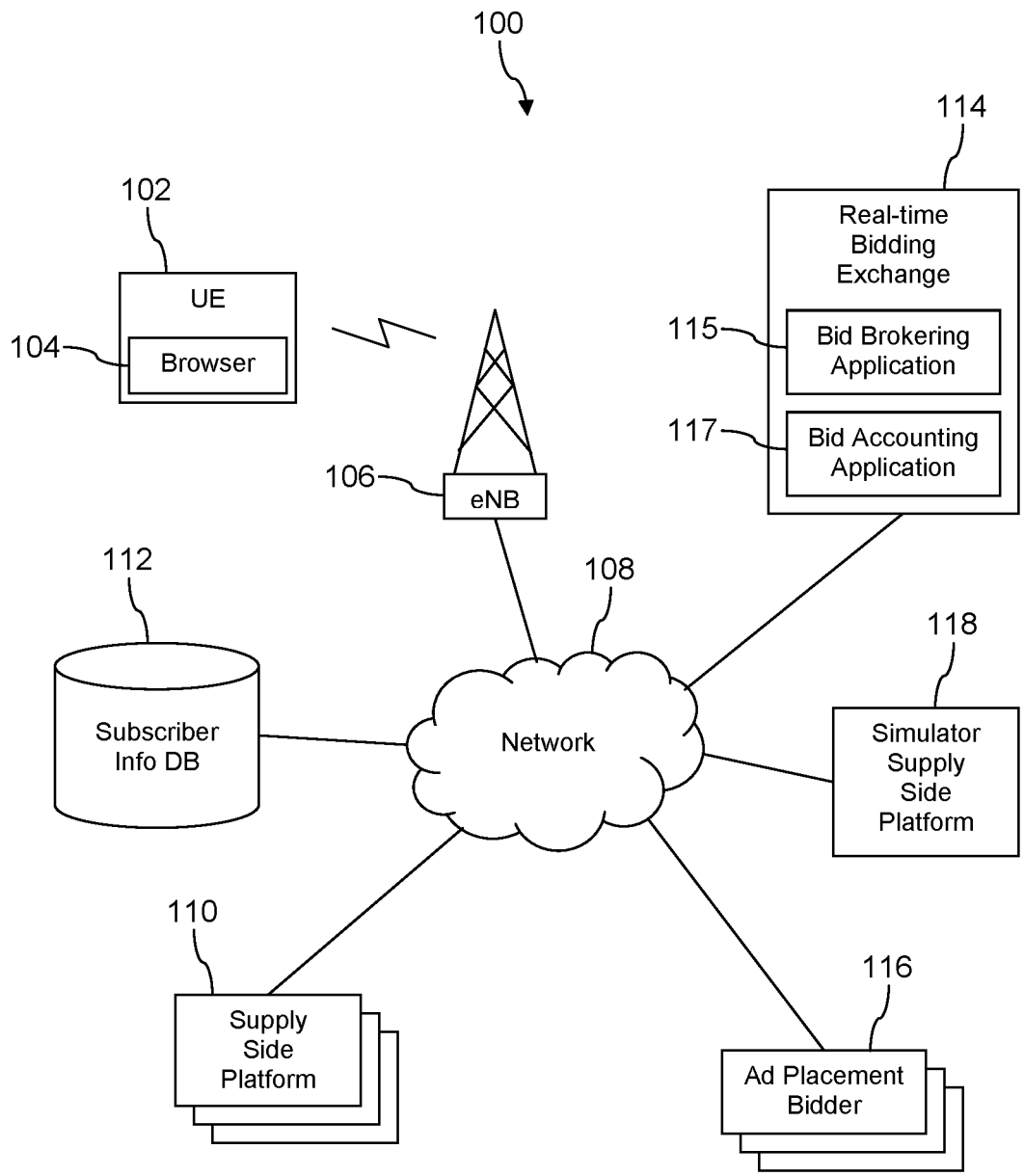
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a real-time ad bidding exchange (RTB) that provides continuous integration testing. Mobile communication devices and stationary personal computers may experience opportunities to present secondary electronic content proximate to other primary content. For example, a web browser may render a news article in a main window and present a banner ad at the top of the main window. For example, a user installed gaming application may be presented in a main window and may present an ad in a left side or right side margin of the main window. When an opportunity to present an ad on the device or computer occurs, a supply side platform may notify the RTB of the opportunity and provide supporting information such as a media type and possibly information about the subscriber. The RTB may in turn notify a plurality of ad placement bidders of the opportunity, receive bids from the ad placement bidders, select one or more of the bids, and send the bid or bids up to the supply side platform. The supply side platform may send an ad provided by the bidders to the mobile communication device or stationary personal computer for rendering. The turn-around time for presenting the ad or secondary content may be about 150 mS to 500 mS.

The eco-system for providing dynamic secondary content, such as ads, may handle a great many opportunities at a high flow-through rate and involve collaboration of many different independent systems. The opportunities may designate different media types. The eco-system may change over time, for example new media types may be rolled out or new policies may be imposed on the RTB and ad placement bidders by the supply side platforms and new ad placement bidders may be on-boarded with the RTB. It is desirable to test the ability of the eco-system to handle the new media types and to support the new policies. It is desirable to assure the new ad placement bidder works properly with the RTB. These activities may be referred to as integration testing, as the ability of multiple systems to cooperate end-to-end to complete a collaborative function is tested. It is a teaching of this disclosure that this integration testing be performed automatically under control of the RTB while simultaneously handling live ad placement bidding functions. It is thought that such live production testing provides the most thoroughgoing and realistic validation of interoperability and/or integration among independent systems, and this is expected to have the benefit of reducing the possibility of failure when bringing on new collaborators (i.e., new ad placement bidders), when introducing new media types, when rolling out new processing algorithms, and when deploying other system changes.

In an embodiment, the RTB or a proxy host sets a test parameter to have a TEST value or to have an active value in an ad bid request. It is understood that the TEST value and a NOT TEST value are abstract values or logical values and stand for whatever value corresponds to this logical or abstract state. For example, the test parameter value corresponding to the TEST value may be a TRUE value or a "1" value while the test parameter value corresponding to the NOT TEST value may be a FALSE value or a "0" value. Any other literal values may be used for the logical or abstract values TEST and NOT TEST used throughout this specification. The test parameter in a bid request may be said in some contexts to indicate that a bid request is a request for an actual bid or a request for a test bid. The test parameter in a bid may be said in some contexts to indicate that a bid is an actual bid or a test bid.

The handling of the ad bid request follows normal channels with the exception of how accounting processes associated with the ad bid request are handled. More specifically, an ad bid request from a supply side platform that is a test ad bid request has the test parameter set to a TEST value or to an active value. The ad bid request is sent to a plurality of ad placement bidders by the RTB. The ad placement bidders process the ad bid request normally but can take notice of the ad bid request being a test ad bid request, based on the test parameter TEST value or active value. The ad placement bidders return ad bid responses, with a test parameter TEST value set, when they are responding to an ad bid request with a test parameter TEST value set. The RTB selects one or more of the ad bid responses and transmits the ad bid response to the originator of the ad bid request, for example to an ad gateway or to a simulator supply side platform. The RTB accounts for the ad bid response differently, however, based on the test parameter TEST value or active value. For example, the RTB does not aggregate the cost of the winning ad bid to an account of the ad placement bidder associated with the winning ad bid but does log information about the turn-around time of the ad placement bidders, any no-bid responses that are received, the costs of ad bids, and any exceptions that may have been generated by the RTB associated with processing ad bid responses (e.g., a media type mismatch exception when an ad placement bidder returns an ad bid response associated with a media type that is incompatible with the media type designated in the ad bid request). This information can be stored in a test log and can be analyzed to generate test results.

In an embodiment, a simulator supply side platform is configured to perform the role of a supply side platform that sends ad bid requests to the RTB. The simulator can add the test parameter TEST value or active value to the ad bid requests it sends to the RTB and can analyze the ad bid responses returned by the ad placement bidders. The simulator can evaluate the analysis results to determine the success or failure of test runs. The simulator can generate varying volumes of ad bid requests to stress test the RTB and/or the ad placement bidders. It is understood that test ad bid requests may also be sent by ad gateways to test the performance of the RTB and the ad placement bidders, for example to test compliance with new policies mandated by the ad gateway. In an embodiment, the simulator supply side platform retrieves test log information from the RTB and combines that with test information that it has. In an embodiment, the simulator may likewise maintain a test log of information derived from analyzing ad bid responses having the test parameter TEST value.

The continuous integration testing capability taught herein promotes realistic testing circumstances under real-world conditions, that is testing while the RTB is handling real, non-test ad bid requests and ad bid responses. There is no distinction made by the RTB between processing ad bid requests with a test parameter TEST value or active value and processing ad bid requests with the test parameter NOT TEST value or inactive value, other than in the accounting for ad bid responses. The simulator supply side platform can inject a heavy load of simulated ad bid requests to stress test the RTB and/or ad placement bidders. Additionally, the simulator supply side platform can inject a low volume of simulated ad bid requests on a more or less continuous basis (albeit at low volume) to test for and detect breakages in the eco-system.

Turning now to FIG. 1, a system 100 is described. In an embodiment, system 100 comprises a user equipment (UE) 102 having a browser 104, an enhanced node B (eNB) 106, and a network 108. The eNB 106 provides wireless communication links to the UE 102 and communicatively couples it to the network 108 and thence to data sources and to other UEs to complete data calls or voice calls. The UE 102 may be a mobile phone, a mobile communication device, a personal digital assistant (PDA), a media player, a wearable computer, a headset computer, a laptop computer, a tablet computer, or a notebook computer. When the browser 104 requests content to render on the UE 102, a supply side platform 110 may obtain an ad or other secondary content to send to the UE 102 to be presented proximate to content by the browser 104, for example in a banner position above the primary content. Secondary content may comprise politically inspired messages or public service type of messages. It is understood that the system 100 may comprise a large number of UEs 102 and eNBs 106. It is understood that a single eNB 106 may maintain a plurality of wireless communication links with a plurality of UEs 102 concurrently.

The supply side platform 110 may send an ad bid request to a real-time bidding exchange (RTB) 114 to submit an ad bid response. The RTB 114 may in turn propagate the ad bid request to a plurality of ad placement bidders 116. The ad placement bidders 116 may analyze the ad bid request, decide to bid or to submit a no bid response, and transmit their response to the RTB 114. The RTB 114 may choose one or more ad bid responses sent by ad placement bidders 116 and send the chosen ad bid responses to the supply side platform 110 from which it received the ad bid request. In an embodiment, the RTB 114 chooses or selects an ad bid response within about 150 mS after transmitting an ad bid request to the ad placement bidders 116 or sends a no bid response within about 150 mS. In another embodiment, however, the RTB 114 may choose or select an ad bid response within a different time frame, for example within about 100 mS after transmitting an ad bid request or within about 75 mS of transmitting an ad bid response, or within about 50 mS of transmitting an ad bid response. In an embodiment, the RTB 114 may adaptively determine a time threshold for selecting an ad bid response, for example based on analysis of lost bids (bids provided to the supply side platform 110 that are not accepted) in the context of ad bid response time.

In some cases, the RTB 114 may send no ad bid response or may send a no-bid ad bid response to the supply side platform 110. The RTB 114 may compare the media type of an ad bid response to the media type identified in the ad bid request send by the supply side platform 110 and may drop ad bid responses whose media type is different from the requested media type. The ad bid responses may comprise the actual ad content or secondary content. A bid brokering application 115 that executes on the RTB 114 may provide the processing and/or handling of bid requests and bid responses described herein. A bid accounting application 117 that executes on the RTB 114 may provide accounting services for bid processing and handling, for example keeping track of winning bids that ad placement bidders 116 may be billed for. The bid accounting application 117 may provide test related processing related to analyzing test results, determining test performance metrics, generating test reports, and/or providing test analysis and/or test data support to a simulator supply side platform 118. The supply side platform 110 sends the ad content or secondary content to the browser 104 which displays the ad content or secondary content on the UE 102.

While a browser 104 is illustrated and described herein, it is understood that another application installed on the UE 102 may send a request for content that is associated with an opportunity to present ad content or secondary content on the UE 102. For example, a gaming application may be associated with an opportunity to present ad content or secondary content on the UE 102. Additionally, while the description refers to an ad bid request and an ad bid response, it is understood that the supply side platform 110 may send a bid request for secondary content (e.g., something other than commercial promotion content) to the RTB 114 and receive a bid response for secondary content from the RTB 114. In turn, the RTB 114 may send the bid request for secondary content to the ad placement bidders 116 (who may also be referred to as demand side platforms (DSPs) in some contexts) and receive bid responses for secondary content from the ad placement bidders 116.

A variety of different supply side platforms 110 may be engaged in providing ads, or secondary content to UEs 102, and the RTB 114 may be configured to interwork with a plurality of different supply side platforms 110. The supply side platforms 110 may access information about the UE 102 and/or a subscriber associated with the UE 102 from a subscriber information data store 112. The subscriber information may comprise demographic information, behavioral history, and/or cluster membership information that may be useful for evaluating the desirability of submitting an ad bid response and/or to determine the value of bidding for the opportunity of presenting an ad on the UE 102.

The RTB 114 may establish data communication connections with the ad placement bidders 116, for example transfer control protocol (TCP) connections. The RTB 114 may establish a plurality of data communication connections with a single ad placement bidder 116, for example 50 concurrent TCP connections to a single ad placement bidder 116. The use of multiple data communication connections between the RTB 114 and a single ad placement bidder 116 may be desirable to promote a high volume of ad bid request/ad bid response messages with low latency. In an embodiment, the RTB 114 may comprise a plurality of servers or hosts, whereby to handle the heavy processing load of real-time ad brokering traffic. In an embodiment, as an example, each of ten servers in the RTB 114 may establish five concurrent TCP connections to a single ad placement bidder 116. Each of the ten servers in the RTB 114 may establish a plurality of concurrent TCP connections with multiple ad placement bidders 116.

The system 100 may further comprise a simulator supply side platform 118 that is operable to send simulated ad bid requests to the RTB 114 to promote integration testing of the RTB 114 and or the ad placement bidders 116. These are said to be simulated ad bid requests because they are not associated with actual opportunities to present ads or secondary content on UEs 102 but are generated in the form of ad bid requests for purposes of testing some of the functioning of the system 100. The supply side platforms 110, the RTB 114, the ad placement bidders 116, and the simulator supply side platform 118 may be implemented as computer systems. Computer systems are described further hereinafter.

The supply side platforms 110 may occasionally desire to test ad bidding and/or ad placement functionality through the RTB 114. A supply side platform 110 may send test ad requests through a dedicated data communication connection to the RTB 114 that is understood to contain test ad requests. Alternatively, the supply side platform 110 may comprise a plurality of servers or host computers, and one of the servers in a supply side platform 110 may send test ad requests to the RTB 114. The test ad request messages sent by the supply side platform 110 may not comprise any indication that they are for testing purposes. A proxy server (not shown) between the supply side platform 110 and the RTB 114 may process such test ad request messages sent by the supply side platform 110 and add a test parameter having an active value or a TEST value to the test ad request message before sending on to the RTB 114. Alternatively, this processing may be provided by a component, module, subroutine, or application of the RTB 114 itself.

Figure 2:
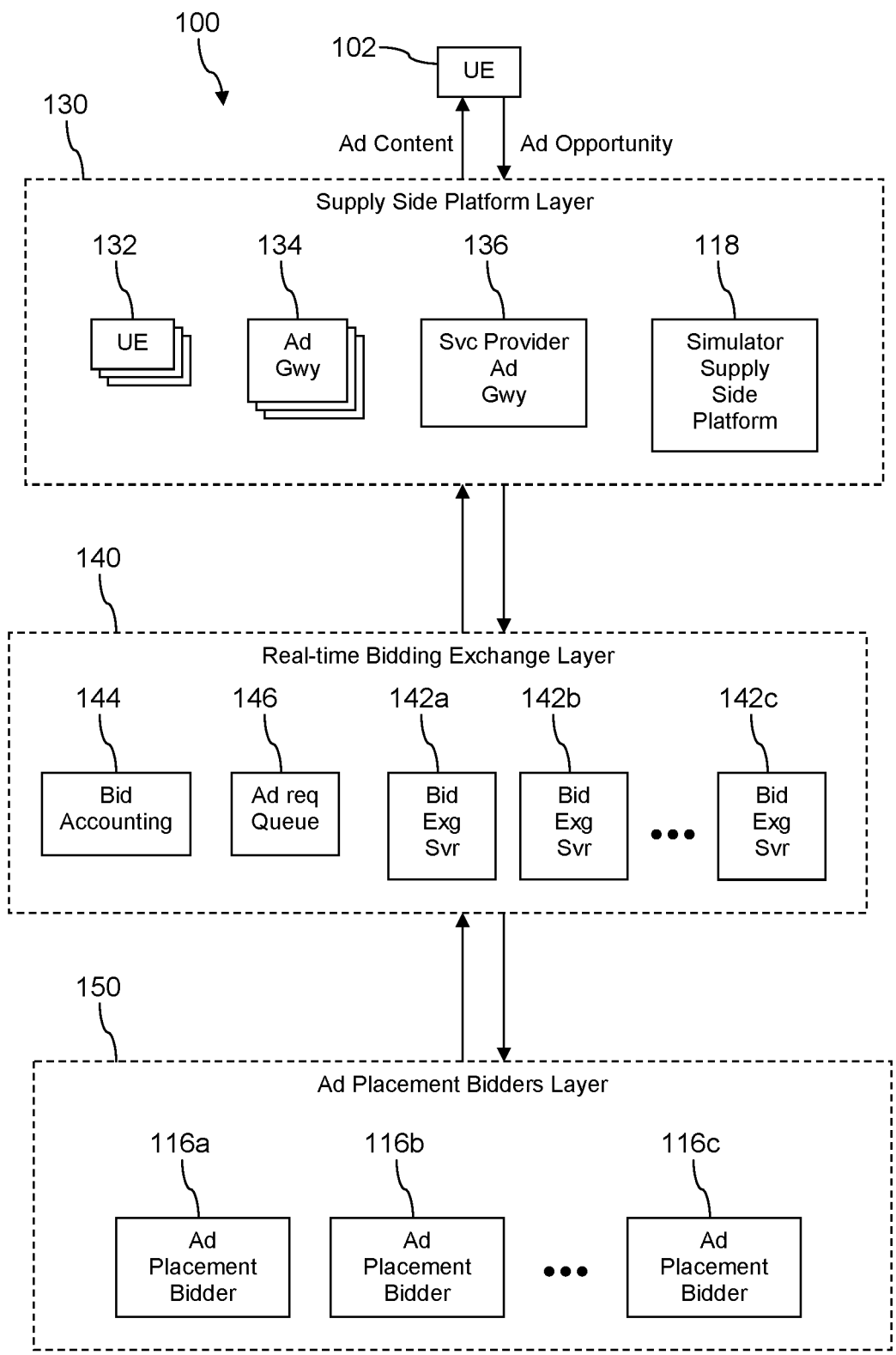
FIG. 2 is block diagram of a communication system according to an embodiment of the disclosure.

Turning now to FIG. 2, further details of the system 100 are described. The system 100 can be abstracted differently than as depicted in FIG. 1. The UE 102 can communicate with a supply side platform layer 130; the supply side platform layer 130 can communicate with the RTB exchange layer 140; and the RTB exchange layer 140 can communicate with an ad placement bidder layer 150. In an embodiment, the supply side platform layer 130 may comprise a plurality of ad gateways 134, a service provider ad gateway 136, and the simulator supply side platform 118. The service provider ad gateway 136 may be an ad gateway operated by a wireless communication service provider that also provides the RTB 140. In an embodiment, some UEs 132 may send an ad bid request to the RTB exchange layer 140, for example a software development kit (SDK) embedded in a user installed application or in a system application of the UE 132 may send an ad bid request to the RTB exchange layer 140 140 when an ad presentation opportunity is available for the UE 132.

The RTB exchange layer 140 comprises a plurality of bid exchange servers 142, for example a first bid exchange server 142*a*, a second bid exchange server 142*b*, and a third bid exchange server 142*c*. The bid exchange servers 142*a*, 142*b*, and 142*c* may each provide functionality described above with reference to the bid brokering application 115. The RTB exchange layer 140 further comprises a bid accounting server 144. The bid accounting server may provide functionality described above with reference to the bid accounting application 117. Collectively the RTB exchange layer 140 may be said to provide the functionality of the real-time bidding exchange (RTB) 114 illustrated in FIG. 1 and described above. The RTB exchange layer 140 may receive and respond to ad bid requests from any of the entities forming the supply side platform layer 130. In an embodiment, ad bid requests from the supply side platform layer 130 may be stored in a pool or queue 146 of ad bid requests, and the bid exchange servers 142*a*, 142*b*, 142*c* may retrieve enqueued ad bid requests from the queue 146 for processing. It is understood that notwithstanding the use of a storage pool or a queue 146 the response turnaround cycle is very short, for example about 100 mS to 50 mS from receipt of an ad bid request coming in to the RTB exchange layer 140 to sending an ad bid response out from the RTB exchange layer 140.

The system 100 may be used to perform and/or test a variety of different integration scenarios while servicing actual ad and/or secondary content delivery to UE 102 and UE 132. For example, an ad gateway 134 may test the ability of the RTB exchange layer 140 and the ad placement bidders 150 to support a new media type. Success may be deemed 90% freedom from media mismatch errors, 99% freedom from media mismatch errors, or some other threshold. An ad gateway 134 may test the ability of the RTB exchange layer 140 to handle a surge load of ad bid requests, in anticipation of a burst of such ad bid requests on the launch of a new application or linked to a significant public event. Success may be deemed receiving a valid timely ad bid response in 95% of ad bid requests, in 99% of ad bid requests, or some other threshold.

In the ad placement bid layer 150, the ad placement bidder 116 may comprise a first ad placement bidder 116a, a second ad placement bidder 116b, and a third ad placement bidder 116c. It is understood that the ad placement bid layer 150 may comprise any number ad placement bidders 116. The system 100 may be used to test a new ad placement bidder 116 before sending them actual ad bid requests. The RTB exchange layer 140 may send test ad bid requests to the new ad placement bidder 116 and verify that it receives valid ad bid responses that are timely. The RTB exchange layer 140 may establish multiple data communication connections to the new ad placement bidder 116, send ad bid requests down each connection, and verify that it receives ad bid responses on each of the connections, whereby to verify the handling of concurrent data communication connections by the new ad placement bidder 116. Said in another way, the RTB exchange layer 140 and/or the simulator supply side platform 118 may analyze the ad bid responses and the data connections on which the ad bid response messages are received to evaluate and/or test the use of multiple concurrent data connections by the new ad placement bidder 116. In an embodiment, the RTB exchange layer 140 may test the use of multiple concurrent data connections by other ad placement bidders 116 (i.e., incumbent or established ad placement bidders). The RTB exchange layer 140 may compare its accounting of ad bid response wins for the new ad placement bidder 116 versus the accounting of the bidder 116. If the ad placement bidder 116 is not able to properly handle high volumes of communications, for example, the RTB exchange layer 140 may count 100,000 ad bid responses wins for the bidder 116 when the bidder 116 only counts 80,000 wins, for example because the bidder 116 may have failed to timely receive or handle 20,000 win notification messages sent to it by the RTB exchange layer 140.

As said above, the RTB layer or platform 140 processes the ad bid requests and the ad bid responses the same, whether they have a test parameter TEST value or active value or a test parameter NOT TEST value or inactive value. The bid accounting process 144, however, takes notice of the test parameter active or inactive values (i.e., TEST or NOT TEST, respectively). The bid accounting process 144 may tally winning bids and accumulate bills for ad placement bidders 116. It is desirable that the ad placement bidders 116 not be charged for winning ad bids that had a test parameter TEST value or active value. The bid accounting process 144, therefore, examines the test parameter and processes the ad bid responses accordingly. In an embodiment, the bid accounting process 144 determines a winning bid settlement metric that indicates an amount of agreement between calculation of an aggregation of winning bids produced by the ad placement bidders 116 and calculation of an aggregation of winning bids produced by the bid accounting process 144.

The bid accounting process 144 can keep aggregated statistics or metrics on ad bid requests sent to ad placement bidders 116 and ad bid responses returned by ad placement bidders 116, both test related ad bid requests and live or real ad bid requests. The bid accounting process 144 creates logs related to testing. For example, the bid accounting process 144 can log events of media mismatch (a first media type was designated in a bid request message but a bid response message having an ad or secondary content of a second, different media type was returned). The bid accounting process 144 can keep logs and generate statistics on winning bid responses, timed out bid responses (i.e., a bid that was received after a maximum time delay threshold), and no bid responses. The bid accounting process 144 can determine how many connections are established between an ad placement bidder 116 and the bid exchange servers 142. This information can be collected together and packaged to associate to a given test run.

The bid accounting process 144 may determine a variety of test metrics. The bid accounting process 144 may determine a response time metric for an ad placement bidder 116 as the time between transmission of an ad bid request to the ad placement bidder 116 and the time of receipt of a corresponding ad bid response from the ad placement bidder 116. The response time metric may be an average or median time between transmission and receipt. The bid accounting process 144 may determine statistics for response time across all the ad placement bidders 116 and compare the response time of one ad placement bidder 116 to the response time statistical norms across all bidders. The bid accounting process 144 may determine a no bid response frequency for an ad placement bidder 116 and may compare that frequency to statistical norms of no bid response frequency across all the ad placement bidders 116.

The bid accounting process 144 may determine a media type error metric based on mismatch between a media type specified in an ad bid request and a media type provided in an ad bid response. The media type error metric may be determined as a frequency of media type mismatch between the media type specified and the media type returned in the ad bid response by one ad placement bidder 116. The bid accounting process 144 may determine statistical norms of media type mismatches across all ad placement bidders 116 and may create a metric comparing the media type mismatch frequency of one ad placement bidder 116o to the media type mismatch statistical norms.

In an embodiment, the simulator supply side platform 118 may calculate the test metrics associated with the ad placement bidders 116 rather than the bid accounting process 144. In an embodiment, the bid accounting process 144 may provide logs and/or metrics to the simulator supply side platform 118 to perform further analysis of performance metrics.

A test run may be initiated by an ad gateway 134 in the supply side platform 130. Alternatively, a test run may be initiated by an administrator using an interface to the simulator supply side platform 118, for example to define a volume of simulated ads and a mix of media types to send to the RTB exchange layer 140. In an embodiment, the administrator may be able to direct the simulated ad bid requests created by the simulator supply side platform 118 to be sent by the RTB exchange layer 140 to a specific ad placement bidder 150, for example a new ad placement bidder 150 who is undergoing integration testing prior to being brought into operation. A test run may continue for tens of seconds, a minute or two minutes, or ten or more minutes.

In an embodiment, the simulator supply side platform 118 may send out a background level of simulated ad bid requests on an ongoing basis to test the RTB exchange layer 140 and the ad placement bidders 150 on an ongoing basis. A background level of simulated ad bid requests may be about 1% of test ad bid requests generated by the simulator supply side platform 118 versus 99% of real ad bid requests generated by other supply side platforms. A background level of simulated ad bid requests may be about 2% of test ad bid requests generated by the simulator supply side platform 118 versus 98% of real ad bid requests generated by other supply side platforms. A background level of simulated ad bid requests may be some other low percentage of test ad bid requests versus real ad bid requests.

Figure 3:
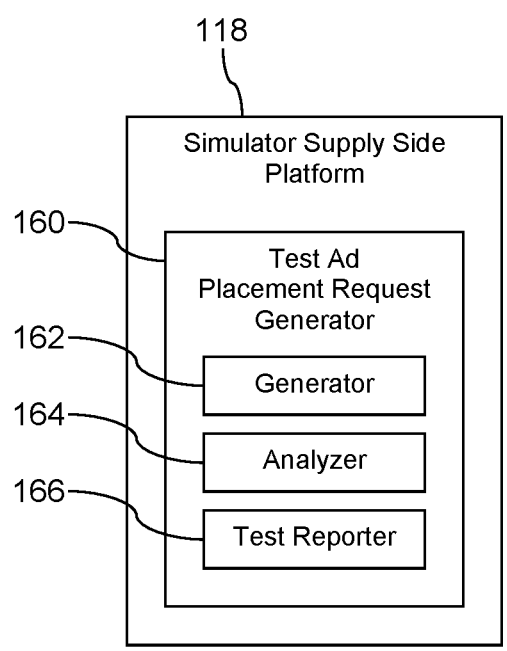
FIG. 3 is a block diagram of a simulator supply side platform according to an embodiment of the disclosure.

Turning now to FIG. 3, further details of the simulator supply side platform 118 are described. In an embodiment, the simulator supply side platform 118 comprises a test ad placement request generator 160. The test ad placement request generator 160 comprises a generator 162, an analyzer 164, and a test reporter 166. The generator 162 may create and transmit ad bid requests with the test parameter set to TEST value or to active value to the RTB exchange layer 140. An administrator may use a web interface or other tool to control the test ad placement request generator 160 and the generator 162. For example, the interface may be used to define a rate of ad bid requests, one or more media types of the requests and a ratio among media types, and possibly other parameters relevant to the ad bid requests such as optional protocols to be used such as secure HTTP versus ordinary HTTP.

The analyzer 164 can analyze ad bid responses received by the simulator supply side platform 118. It can also reach out to the RTB exchange layer 140, for example to the bid accounting process 144, to obtain logs of ad request responses having a test parameter with a TEST value or an active value. The analyzer 164 can determine how many parallel connections an ad placement bidder 116 may have open and determine if it is able to support an agreed upon throughput of ad bid requests in a timely manner. The analyzer 164 can determine an average response time of the ad placement bidder 116. The analyzer 164 can determine if the ad placement bidder 116 handles different media type criteria in ad bid requests correctly (e.g., reply with an ad bid response that conforms to a media type criteria of the ad bid request). The analyzer 164 can determine if other errors occur and the circumstances of the errors.

The test reporter 166 may collate and/or marshal the determinations of the analyzer 164 to provide a report of a test run. The report may be used by an administrator to approve or disapprove bringing on board a new ad placement bidder 116 with the RTB exchange layer 140. The report may be used to identify breakages in the system 100. The report may be used to demonstrate to a supply side platform 110 that the RTB 114 is functioning appropriately. The test reporter 166 may review the metrics developed by the bid accounting process 144 described above. The test reporter 166 may analyze the ability of ad bidders 116 to support different media types in ad placement bid requests. The test reporter 166 may analyze the ability of ad bidders 116 to support a plurality of concurrent data communication connections to the RTB exchange layer 140. The test reporter 166 may analyze the ability of ad bidders 116 to support a maximum response latency time (i.e., a time delay between sending an ad bid request to the ad bidder and receiving a corresponding ad bid response from the ad bidder).

Figure 4A:
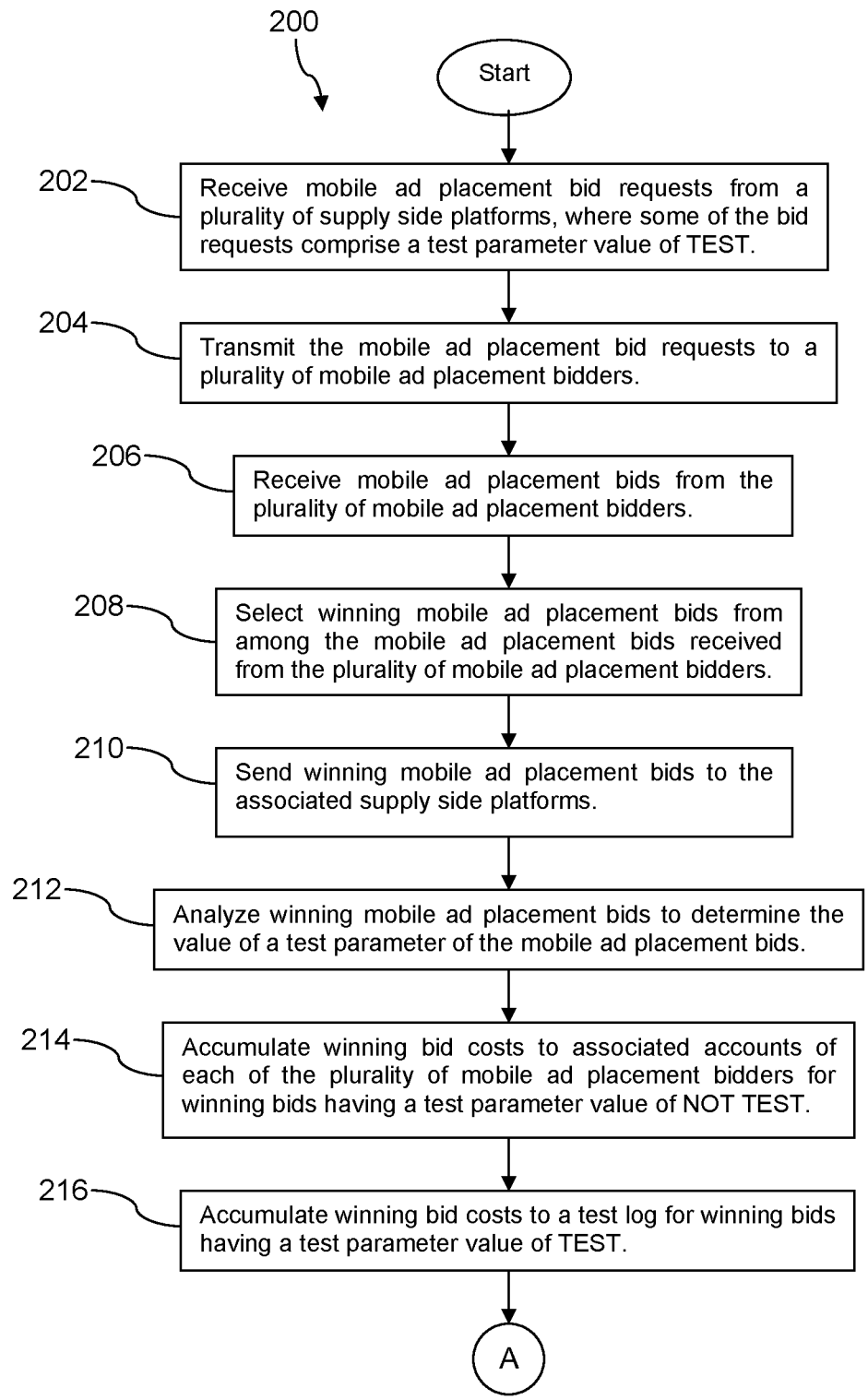
FIG. 4A and FIG. 4B are a flow chart of a method according to an embodiment of the disclosure.
Figure 4B:
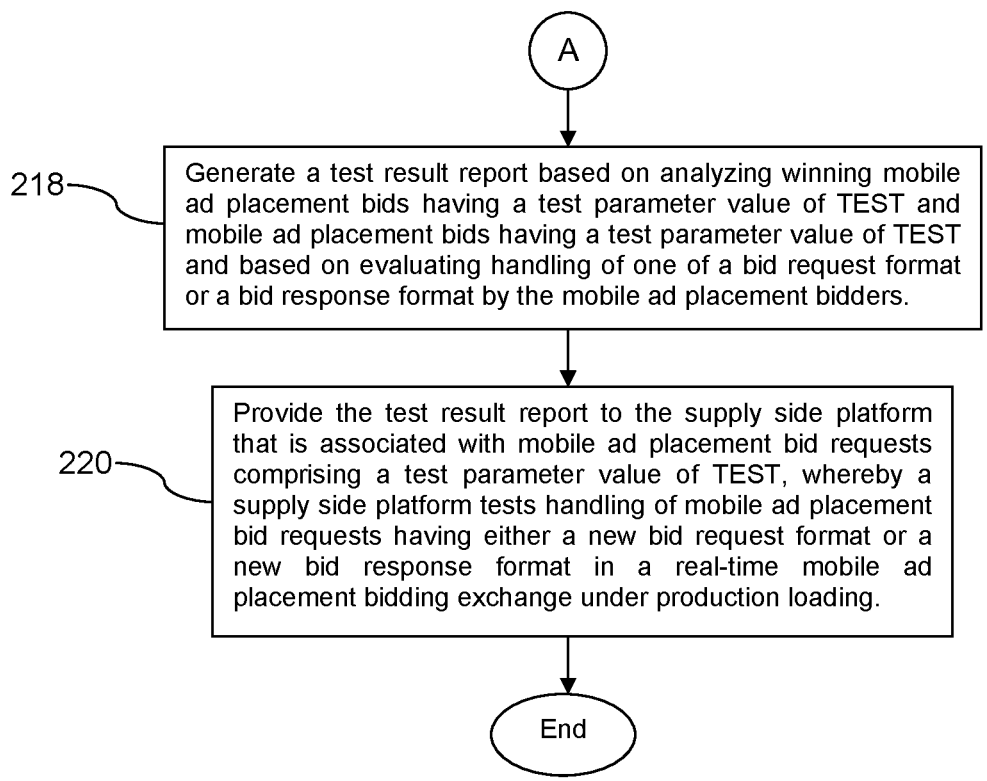

Turning now to FIG. 4A and FIG. 4B, a method 200 is described. At block 202, receive mobile ad placement bid requests from a plurality of supply side platforms, where some of the bid requests comprise a test parameter value that indicates they are test bid requests (e.g., the test parameter value of TEST). It may be said that bid requests that comprise a test parameter value of TEST comprise a test parameter value that indicates they are test bid requests. In some contexts, mobile ad placement bid requests may be referred to as ad bid requests or ad bid request messages. At block 204, transmit the mobile ad placement bid requests to a plurality of mobile ad placement bidders. At block 206, receive mobile ad placement bids from the plurality of mobile ad placement bidders. In some contexts, mobile ad placement bids may be referred to as ad bid responses or ad bid response messages. At block 208, select winning mobile ad placement bids from among the mobile ad placement bids received from the plurality of mobile ad placement bidders.

At block 210, send winning mobile ad placement bids to the associated supply side platforms. At block 212, analyze winning mobile ad placement bids to determine the value of a test parameter of the mobile ad placement bids. At block 214, accumulate winning bid costs to associated accounts of each of the plurality of mobile ad placement bidders for winning bids determined to be actual bids based on the value of the test parameter of the bids, for example bids having a test parameter value of NOT TEST (i.e., value of inactive). At block 216, accumulate winning bid costs to a test log for winning bids determined to be test bids based on the value of the test parameter of the bids, for example bids having a test parameter value of TEST.

At block 218, generate a test result report based on analyzing winning mobile ad placement bids and mobile ad placement bids determined to be test bids based on the value of the test parameter of the bids (e.g., winning mobile ad placement bids having a test parameter value of TEST and mobile ad placement bids having a test parameter value of TEST) and based on evaluating handling of one of a bid request format or a bid response format by the mobile ad placement bidders. Analysis of test success and test performance can be based on many different dimensions of behavior and performance. For example, the average response time can be determined for a given ad placement bidder 116 and compared to an average response time across a plurality of ad placement bidders 116. Such statistics can be determined and compared for each of a plurality of different media types. Analysis can comprise determining that a secure hypertext transport protocol (HTTPS) has been supported when indicated in the ad bid request. Analysis can comprise comparing a media type of an ad bid response to the media type specified in the corresponding ad bid request.

At block 220, provide the test result report to the supply side platform that is associated with mobile ad placement bid requests comprising a test parameter value of TEST, whereby a supply side platform tests handling of mobile ad placement bid requests having either a new bid request format or a new bid response format in a real-time mobile ad placement bidding exchange under production loading.

Figure 5A:
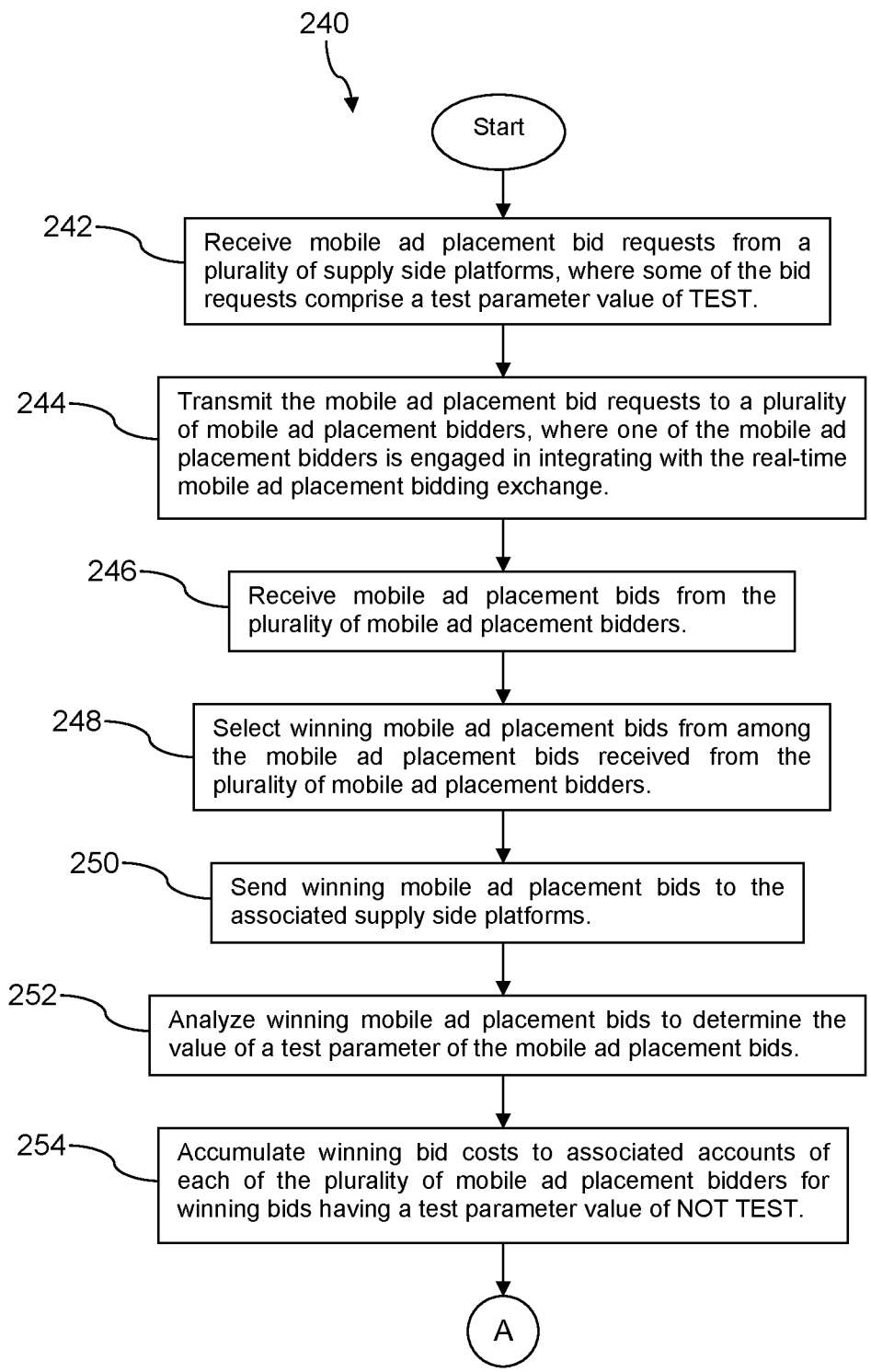
FIG. 5A and FIG. 5B are a flow chart of another method according to an embodiment of the disclosure.
Figure 5B:
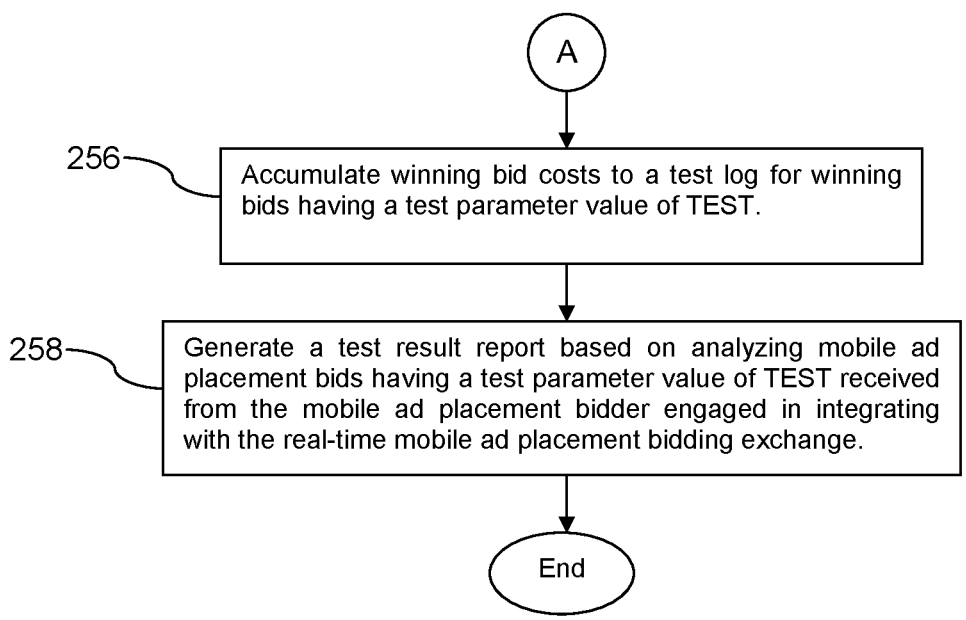

Turning now to FIG. 5A and FIG. 5B, a method 240 is described. At block 242, receive mobile ad placement bid requests from a plurality of supply side platforms, where some of the bid requests comprise a test parameter value that indicates they are test bid requests, for example comprise a test parameter value of TEST (i.e., of value active). The bid requests with the test parameter value of TEST may be generated by the simulator supply side platform 118 or by one or more ad gateways 134. At block 244, transmit the mobile ad placement bid requests to a plurality of mobile ad placement bidders, where one of the mobile ad placement bidders is engaged in integrating with the real-time mobile ad placement bidding exchange. For example, at least some of the mobile ad placement bid requests sent by the simulator supply side platform 118 having the test parameter having a value of TEST are sent to the mobile ad placement bidder that is engaged in integrating with the real-time-mobile ad placement bidding exchange (RTB) 114. At block 246, receive mobile ad placement bids (i.e., ad bid responses) from the plurality of mobile ad placement bidders.

At block 248, select winning mobile ad placement bids from among the mobile ad placement bids received from the plurality of mobile ad placement bidders. At block 250, send winning mobile ad placement bids to the associated supply side platforms. At block 252, analyze winning mobile ad placement bids to determine the value of a test parameter of the mobile ad placement bids. The processing at block 252 may, in an embodiment, further comprise analyzing other mobile ad placement bids (i.e., other ad bid responses) besides the winning bids to determine the value of the test parameter.

At block 254, accumulate winning bid costs to associated accounts of each of the plurality of mobile ad placement bidders for winning bids determined to be actual bids based on the value of the test parameter of the bids, for example bids having a test parameter value of NOT TEST (i.e., of inactive). At block 256, accumulate winning bid costs to a test log for winning bids determined to be test bids based on the value of the test parameter of the bids, for example bids having a test parameter value of TEST. At block 258, generate a test result report based on analyzing mobile ad placement bids determined to be test bids based on the value of the test parameter of the bids, for example bids having a test parameter value of TEST received from the mobile ad placement bidder engaged in integrating with the real-time mobile ad placement bidding exchange. The processing of block 258 may further comprise analyzing the ad placement bids—winners, non-winners, and no-bid responses—to generate statistics associated with testing, for example associated with ad placement bid requests having a test parameter value of TEST.

Figure 6:
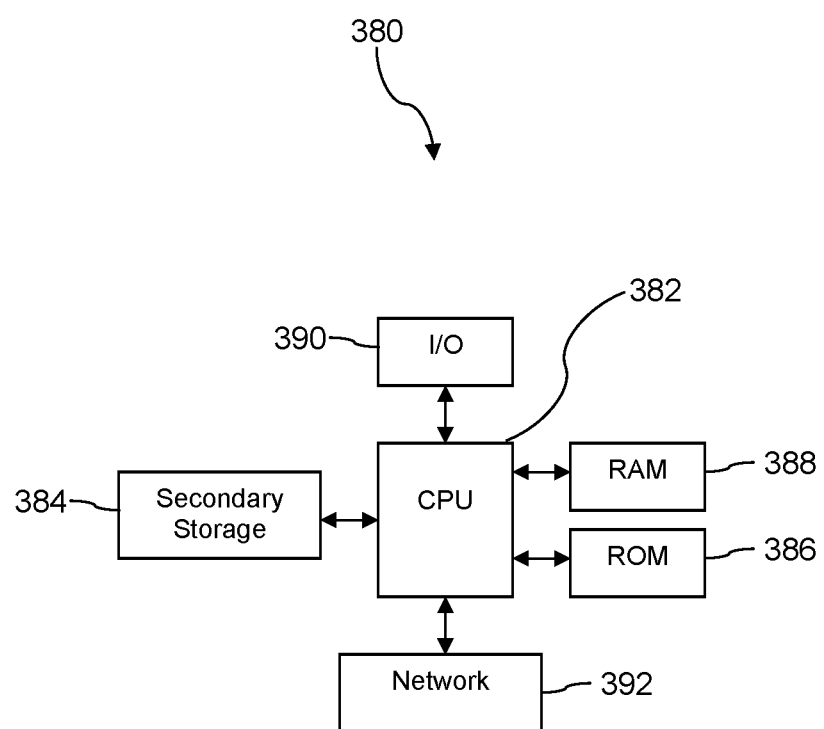
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input or output devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A real-time bidding exchange system for mobile ad placement, comprising:
   a bidding platform that provides integration testing while simultaneously handling live ad placement bidding functions, the bidding platform comprising:
      a first processor,
      a first memory,
      a bid brokering application stored in the first memory that, when executed by the processor:
         receives mobile ad placement bid requests from supply side platforms including a supply side platform testing handling of mobile ad placement bid requests having a new bid request format or a new bid response format in a real-time mobile ad placement bidding exchange under production loading,
         transmits the mobile ad placement bid requests to a plurality of mobile ad placement bidders, wherein the mobile ad placement bid requests comprise test mobile ad placement bid requests with corresponding test parameters and actual mobile ad placement bid requests with corresponding test parameters, receives test mobile ad placement bids and actual mobile ad placement bids associated with the mobile ad placement requests from the plurality of mobile ad placement bidders, selects winning mobile ad placement bids from among the test mobile ad placement bids and the actual mobile ad placement bids, and transmits the winning mobile ad placement bids to the supply side platform that sent the mobile ad placement bid request associated with the winning mobile ad placement bid, and a bid accounting application stored in the first memory that, when executed by the processor:

analyzes winning mobile ad placement bids to determine the value of a test parameter of the winning mobile ad placement bid, accumulates winning bid costs to associated accounts of each of the plurality of mobile ad placement bidders for winning mobile ad placement bids that are determined to be actual mobile ad placement bids based on the value of the test parameter of the actual mobile ad placement bids, accumulates winning bid costs to a test log for winning mobile ad placement bids that are determined to be test mobile ad placement bids based on the value of the test parameter of the test mobile ad placement bids, analyzes winning mobile ad placement bids and mobile ad placement bids determined to be test bids based on the value of the test parameter of the bids, generates a test result report based on the analysis and based on evaluating handling of the new bid request format or the new bid response format by the mobile ad placement bidders, and on analyzing a number of data communication connections used by at least one mobile ad placement bidder, and provides the test result report to the supply side platform that is associated with mobile ad placement bid requests determined to be test bid requests based on the value of the test parameter of the requests, and a simulated ad placement bid request supply side platform comprising:

a second processor, a second memory, a test mobile ad placement bid request generator application stored in the second memory that, when executed by the processor:

tests an increased volume of ad placement bid requests with reduced latency based on data communication connections between the real-time ad placement bidding exchange system and the at least one mobile ad placement bidder by generating and providing the increased volume of ad placement bid requests with reduced latency to the bidding platform for transmission to the at least one ad placement bidder via the data communication connections based on the test result report, builds at least some of the test mobile ad placement bid requests for a mobile ad placement bidder engaged in integrating with the real-time mobile ad placement bidding exchange system, transmits the at least some of the test mobile ad placement bid requests to the bidding platform, receives winning mobile ad placement bids associated with the at least some of the test mobile ad placement bid requests, analyzes the winning mobile ad placement bids received by the test mobile ad placement bid request generator application, wherein analyzing the winning mobile ad placement bids received by the test mobile ad placement bid request generator application comprises analyzing the ability of the mobile ad placement bidder engaged in integrating with the real-time mobile ad placement bidding exchange system to support a plurality of concurrent data communication connections to the real-time ad placement bidding exchange, determine test metrics based on the analyzed winning mobile ad placement bids received by the test mobile ad placement bid request generator application, and determine whether the mobile ad placement bidder engaged in integrating with the real-time mobile ad placement bidding exchange system supports a maximum response latency time based on the test metrics.

2. The real-time bidding exchange system of claim 1, wherein the bidding platform establishes a plurality of data connections with at least one of the plurality of mobile ad placement bidders.

3. The real-time bidding exchange system of claim 2, wherein the test mobile ad placement bid request generator application further analyzes received mobile ad placement bids received from the at least one of the plurality of mobile ad placement bidders associated with the plurality of data connections to the bidding platform to confirm use by the at least one of the plurality of mobile ad placement bidders of each of the plurality of data connections and adds a result of the analysis of use of the plurality of the data connections in the test metrics.

4. The real-time bidding exchange system of claim 1, wherein the test metrics comprise a response time metric that corresponds to a time between transmitting mobile ad placement bid requests to the bidding platform and receiving mobile ad placement bids from the bidding platform.

5. The real-time bidding exchange system of claim 1, wherein the test metrics comprises a media type error metric that corresponds to a mismatch between a media type identified in mobile ad placement bid requests and a media type associated with mobile ad placement bids.

6. The real-time bidding exchange system of claim 1, wherein the test metrics comprises a winning bid settlement metric that indicates an amount of agreement between calculation of an aggregation of winning bids produced by the plurality of mobile ad placement bidders and calculation of an aggregation of winning bids produced by the bid accounting application.

7. The real-time bidding exchange system of claim 1, wherein at least one of the winning mobile ad placement bids transmitted by the bid brokering application to the supply side platform comprises ad content.

8. The real-time bidding exchange system of claim 7, wherein at least some of the mobile ad placement bid requests comprise information about a subscriber associated with a user equipment (UE) on which the ad content is displayed.

9. The real-time bidding exchange system of claim 1, wherein at least one of the winning mobile ad placement bids transmitted by the bid brokering application to the supply side platform comprises secondary content.

10. The real-time bidding exchange system of claim 1, wherein the bid brokering application selects a winning mobile ad placement bid within about 150 milliseconds (mS) after transmitting a corresponding mobile ad placement bid request.

11. The real-time bidding exchange system of claim 1, wherein at least some of the mobile ad placement bid requests comprise an identification of a media type.

12. The real-time bidding exchange system of claim 1, wherein the test result report is generated further based on analyzing a bid response time delay of at least one mobile ad placement bidder.

13. The real-time bidding exchange system of claim 1, wherein the test result report is generated further based on analyzing a no bid response frequency of at least one mobile ad placement bidder.

14. The real-time bidding exchange system of claim 1, wherein the bid accounting application generates another test result report based on analyzing mobile ad placement bids determined to be test bids based on the value of the test parameter of the bids received from the mobile ad placement bidder engaged in integrating with the real-time mobile ad placement bidding exchange system.

15. The real-time bidding exchange system of claim 14, wherein the mobile ad placement bidder engaged in integrating with the real-time mobile ad placement bidding exchange system is sent only mobile ad placement bid requests that are determined to be test bid requests based on the value of the test parameter of the bid requests.

16. The real-time bidding exchange system of claim 14, wherein analyzing the mobile ad placement bids received from the mobile ad placement bidder engaged in integrating with the real-time mobile ad placement bidding exchange system comprises analyzing the ability to support different media types in ad placement bid requests.

17. The real-time bidding exchange system of claim 14, wherein analyzing the mobile ad placement bids received from the mobile ad placement bidder engaged in integrating with the real-time mobile ad placement bidding exchange system comprises analyzing the ability to support a maximum response latency time.

* * * * *